US00RE37383B1

(19) United States
(12) Reissued Patent
Gerstmann et al.

(10) Patent Number: US RE37,383 E
(45) Date of Reissued Patent: Sep. 18, 2001

(54) PRESSURIZED AIR SEAL FOR COMBUSTION CHAMBER

(75) Inventors: Joseph Gerstmann, Framingham; Andrew D. Vasilakis, Bedford, both of MA (US)

(73) Assignee: AOS Holding Company, Wilmington, DE (US)

(21) Appl. No.: 08/641,867

(22) Filed: May 2, 1996

Related U.S. Patent Documents

Reissue of:
(64) Patent No.: 5,171,144
Issued: Dec. 15, 1992
Appl. No.: 07/756,503
Filed: Sep. 9, 1991

(51) Int. Cl.[7] ..... F23D 11/00

(52) U.S. Cl. ..... 431/159; 431/328; 122/17.1

(58) Field of Search ..... 431/159, 328; 126/515, 516, 521; 122/19, 17.1

(56) References Cited

U.S. PATENT DOCUMENTS

| | | | | |
|---|---|---|---|---|
| 2,599,153 | * | 6/1952 | Beckett | 431/188 |
| 2,844,271 | * | 7/1958 | Shelton | 220/585 |
| 3,226,467 | * | 12/1965 | Kienel et al. | 174/18 |
| 3,752,224 | * | 8/1973 | Sproul | 165/47 |
| 3,822,987 | * | 7/1974 | Zanft | 431/353 |
| 3,838,666 | | 10/1974 | Smith | 122/250 |
| 3,942,324 | * | 3/1976 | Johansson et al. | 60/157 |
| 4,252,520 | * | 2/1981 | Bratko | 431/328 |
| 4,280,474 | * | 7/1981 | Ruegg, Sr. | 126/512 |
| 4,626,204 | * | 12/1986 | Saint Julian et al. | 432/222 |
| 4,679,528 | * | 7/1987 | Krans et al. | 431/328 X |
| 4,723,513 | * | 2/1988 | Vallett | 431/328 X |

OTHER PUBLICATIONS

Scientific Energy Systems Corp., Natick, Mass, RAMCAR boiler, 1976.*

Lockinvar Corporation, Nashville, TN, "Power–Fin Gas Fired Water Heaters", Publication PF–6, AAD–10M Jul. 1987.*

* cited by examiner

*Primary Examiner*—Ira S. Lazarus
(74) *Attorney, Agent, or Firm*—Michael, Best & Friedrich LLP

(57) ABSTRACT

Combustion apparatus (10) includes a combustion chamber (12, 212), a cover (24, 208) covering an end wall (14, 210) of the combustion chamber and defining a buffer space (26, 206) therebetween, and a blower (32, 202) external to the cover and supplying air to the buffer space and pressurizing the buffer space to a higher pressure than the combustion chamber such that leakage at penetrations (46) and/or interface (334, 336) flows from the buffer space into the combustion chamber, rather than the reverse, eliminating the need for leak-tight seals, and instead permitting leakage in a desired direction. In one embodiment, a first conduit (58) supplies air along a path (34) from the blower to the mixer and burner assembly without passing through the buffer space, and a second conduit (60) independently supplies air from the blower to the buffer space. A pressure dropping orifice (36) is provided between the blower and the mixer and burner assembly. A gas inlet port (40) is external to the cover (24) and downstream of the pressure dropping orifice (36). The buffer space (26) communicates with the blower (32) along an air flow path (44) upstream of the pressure dropping orifice (36). In another embodiment, air flows through the buffer space (20) to the mixer and burner assembly. The buffer space (26, 206) is thin and flat, and the cover (24, 208) covers only one end wall (14, 210) of the combustion chamber, not the other end wall nor the sidewall, such that the latter are accessible without removing the cover.

9 Claims, 5 Drawing Sheets

4
4
18
16
128
80
84
92
94
98
96
66
22
88
86
82
76
12
334
20
80
14
24
26
65
63
42
62
50
28
61
52
64
72
65
70
78
68
54
156
154
40
58
60
34
44
36
32
56
124
126
130
132
136
134

PRESSURIZED AIR SEAL FOR COMBUSTION CHAMBER

Matter enclosed in heavy brackets [ ] appears in the original patent but forms no part of this reissue specification; matter printed in italics indicates the additions made by reissue.

BACKGROUND AND SUMMARY

The invention relates to combustion apparatus, and more particularly to a sealing arrangement preventing leakage of combustion products through penetrations and interfaces, such as piping and mixer and burner penetrations and end wall interfaces, without requiring leak-tight seals.

In a forced draft combustion system, the pressure of gases within the combustion chamber is usually greater than that of the surroundings. It is often difficult to assure that penetrations for components that pass through the wall of the combustion chamber will not leak, especially since such components must often be readily removable for service or replacement. Also, it is usually necessary for a wall or panel of the combustion chamber to be removable for inspection or maintenance of the combustion chamber or heat exchanger within it. While it is possible to provide individual leak-tight seals for such components, it is expensive to do so, and furthermore it cannot be assured that they will be maintained in proper condition.

The present invention provides penetration and interface seals that are permitted to leak slightly. The invention conditions the environment of the seals so that the leakage is not detrimental. The invention provides an air seal arrangement and combination including a buffer space at penetrations and interfaces, and pressurizes the buffer space to a higher pressure than the combustion chamber, such that any leakage flows into the combustion chamber rather out of the combustion chamber. The direction of leakage into the combustion chamber prevents unwanted escape of combustion gases. Any leakage from the buffer space to the atmosphere will simply be air leakage. The arrangement prevents leakage of gases from the combustion chamber without relying upon leak-tight fittings or seals.

DETAILED DESCRIPTION

Figure 1:
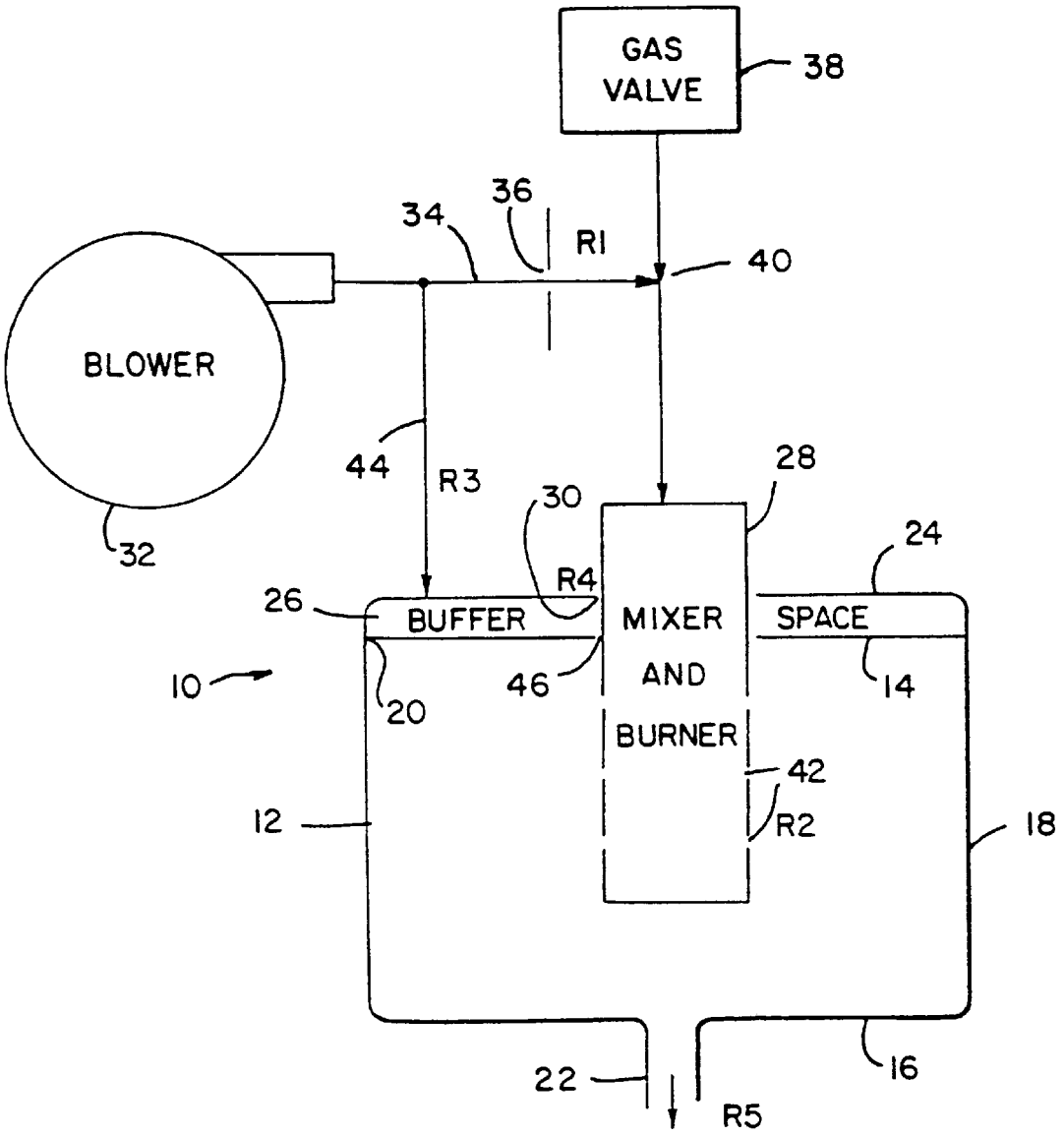
FIG. 1 is a schematic illustration of combustion apparatus in accordance with the invention.

FIG. 1 shows combustion apparatus 10 including a combustion chamber 12 having distally opposite top and bottom end walls 14 and 16, and having a sidewall 18 extending between the end walls. The combustion chamber has an upper opening 20 covered and closed by end wall 14, and has a lower exhaust outlet 22 through end wall 16. A cover 24 external to the combustion chamber covers end wall 14 and defines a buffer space 26 therebetween. One or more penetrations, including a mixer and burner assembly 28, extends through cover 24 and end wall 14 into the combustion chamber. Buffer space 26 has a buffer outlet at penetration 30. Blower 32 supplies air along path 34 through pressure dropping orifice 36 to mixer and burner assembly 28. A gas valve 38 supplies combustion gas to the air stream at gas inlet port 40 downstream of pressure dropping orifice 36. The combustible air-gas mixture flows downwardly in mixer and burner assembly 28 and then radially outwardly through orifices 42 and is ignited to provide heat to a heat exchanger, FIGS. 2 and 6, in combustion chamber 12 to in turn heat liquid in the heat exchanger. Blower 32 supplies air along path 44 to buffer space 26. Pressure dropping orifices 36 and 42 provide a restricted flow path of smaller diameter than flow path 44, such that buffer space 26 is pressurized to a higher pressure than the combustion chamber, such that leakage at penetration 46 flows from buffer space 26 into combustion chamber 12, rather than the reverse. The sum of the pressure drops across orifices 36 and 42 relative to the pressure drop across exhaust outlet 22 is greater than the pressure drop from blower 32 along path 44 to buffer space 26 relative to buffer outlet 30, i.e., $$\frac{R3}{R4} < \frac{R1 + R2}{R5}$$

where R1 is the pressure drop from the blower to the mixer and burner assembly across pressure dropping orifice 36, R2 is the pressure drop from the mixer and burner assembly across orifices 42 to the combustion chamber, R3 is the pressure drop from the blower to the buffer space, R4 is the pressure drop across buffer outlet 30, and R5 is the pressure drop across exhaust outlet 22.

Figures 2, 5:
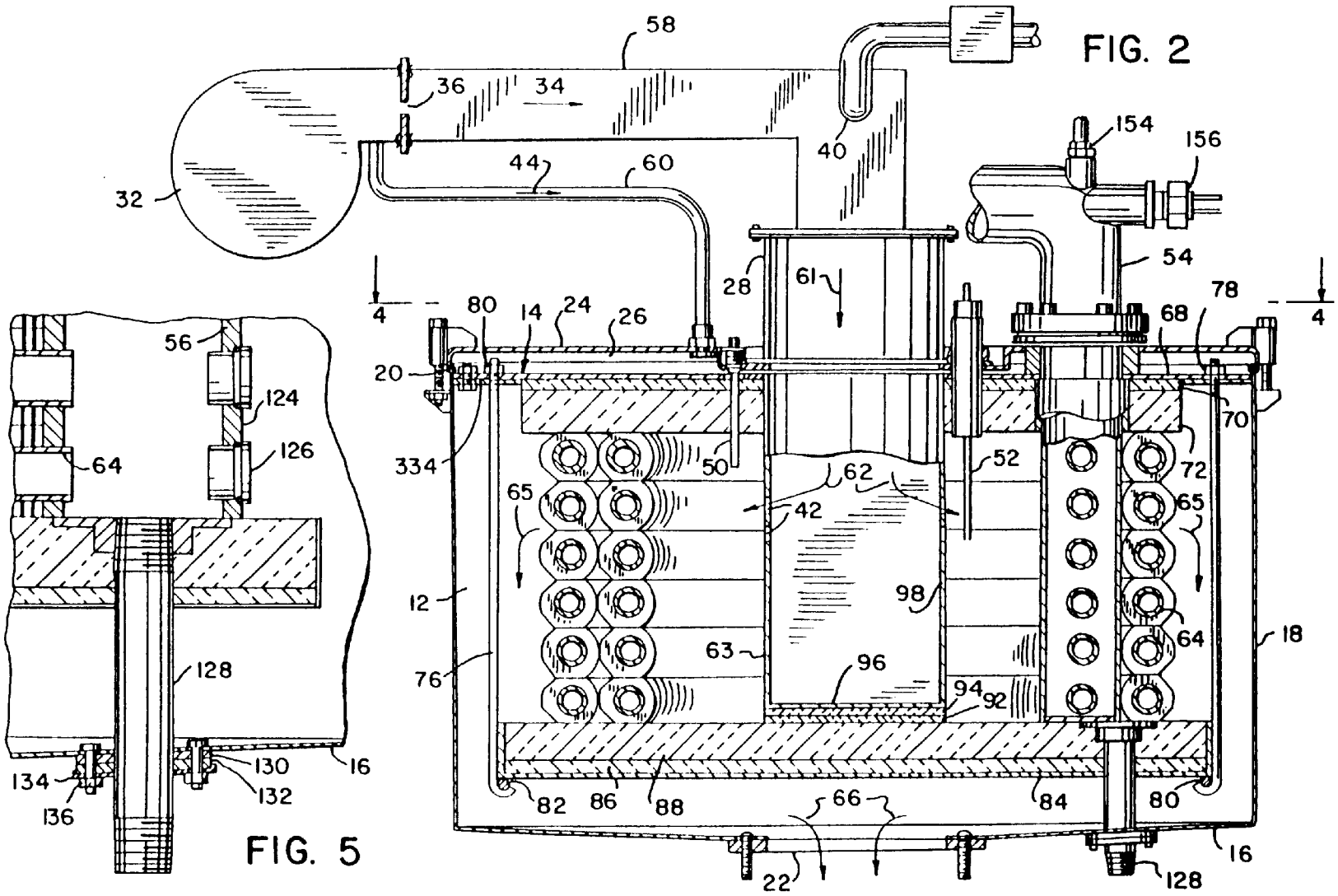
FIG. 2 is a side view partially in section of combustion apparatus in accordance with the invention.
FIG. 5 is a sectional view taken along line 5—5 of FIG. 4.

Referring to FIG. 2, combustion chamber 12 has distally opposite top and bottom end walls 14 and 16, and a sidewall 18 extending between the end walls. Cover 24 is external to combustion chamber 12 and covers end wall 14 and defines buffer space 26 therebetween. End wall 14 has penetrations therethrough, including forced draft mixer and burner assembly 28, flame sensor 50, ignitor 52, and header pipes 54 and 56, FIG. 4. Blower 32 is external to cover 24 and supplies air to buffer space 26 and pressurizes the buffer space to a higher pressure than combustion chamber 12 such that leakage at the penetrations flows from the buffer space into the combustion chamber.

Conduit 58 supplies air along path 34 from blower 32 through pressure dropping orifice 36 to mixer and burner assembly 28. Conduit 60 independently supplies air along path 44 from blower 32 to buffer space 26 and pressurizes the buffer space to a higher pressure than the interior of combustion chamber 12.

Air from conduit 58 and gas from gas valve 38 at gas inlet port 40 flow downwardly as shown at arrow 61 in mixer and burner assembly 28 and then radially outwardly as shown at arrows 62 through orifices 42 in burner sidewall 63 and into the interior of combustion chamber 12, and the air/gas mixture is ignited by ignitor 52, to in turn heat liquid in heat exchanger coil 64. The combustion products flow radially outwardly and then downwardly as shown at arrows 65, and are exhausted as shown at arrows 66 at outlet 22. The combined pressure drops provided across pressure dropping orifice 36 and orifices 42 relative to exhaust outlet 22 is greater than the pressure drop through conduit 60 to buffer space 26 relative to the buffer outlets at the penetration such that the pressure in the combustion chamber is less than the pressure in buffer space 26, and hence leakage at penetrations through end wall 14 flows from buffer space 26 into combustion chamber 12, rather than the reverse.

Figure 3:
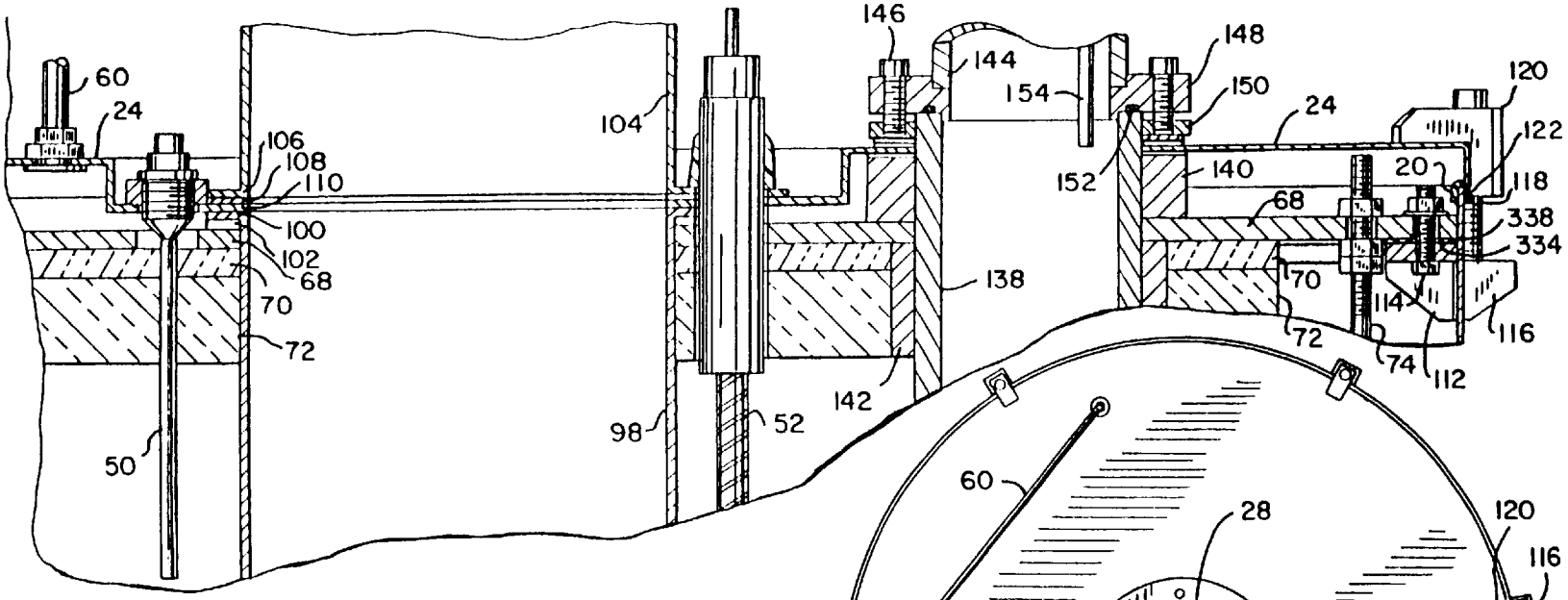
FIG. 3 is an enlarged view of a portion of the structure of FIG. 2.

End wall 14 is provided by three layers, including metal plate 68, FIG. 3, a heat insulating blanket 70, such as provided by Carborundum Corporation under the tradename Fiberfrax Durablanket, and a lower heat insulating board 72, such as provided by Carborundum Corporation under the tradename Fiberfrax Duraboard. Four J-bolts, two of which are shown at 74 and 76, FIG. 2, are mounted on plate 68 by respective nuts such as 78 and 80 and extend downwardly and at their bottom ends curl around a short length of a respective dowel rod such as 80, 82 which is welded to the underside of a metal tray 34, such that tray 34 is suspended and supported below metal plate 68 and adjusted by threaded nuts 78 and 80 at the upper end of respective J-bolts 74 and 76. Resting in tray 84 is a heat insulating blanket 86, such as provided by the above noted Fiberfrax Durablanket, and a heat insulating board 88, such as provided by the above noted Fiberfrax Duraboard. Heat exchanger coil 64 is disposed between boards 88 and 72. Resting on board 88 is a heat insulating blanket 92, such as provided by the above noted Fiberfrax Durablanket, and a heat insulating board 94, such as provided by the above noted Fiberfrax Duraboard. Board 94 engages the bottom 96 of lower portion 98 of the mixer and burner assembly 28. Lower portion 98 of the mixer and burner assembly has an upper flange 100, FIG. 3, resting on gasket 102 on metal plate 68. Upper portion 104 of the mixer and burner assembly has a lower flange 106 resting on gasket 108 on flange 110 of cover 24. The outer edge of metal plate 68 rests on support blocks 112 welded to the inside of sidewall 18 of combustion chamber 12. Plate 68 is secured to support blocks 112 at bolts 114. Clamp blocks 116 are welded to the outside of sidewall 18 of the combustion chamber and have bolts 113 extending upwardly therefrom for receiving clamps 120 which clamp cover 24 downwardly on the combustion chamber at upper opening 20 at gasket 122.

Figure 4:
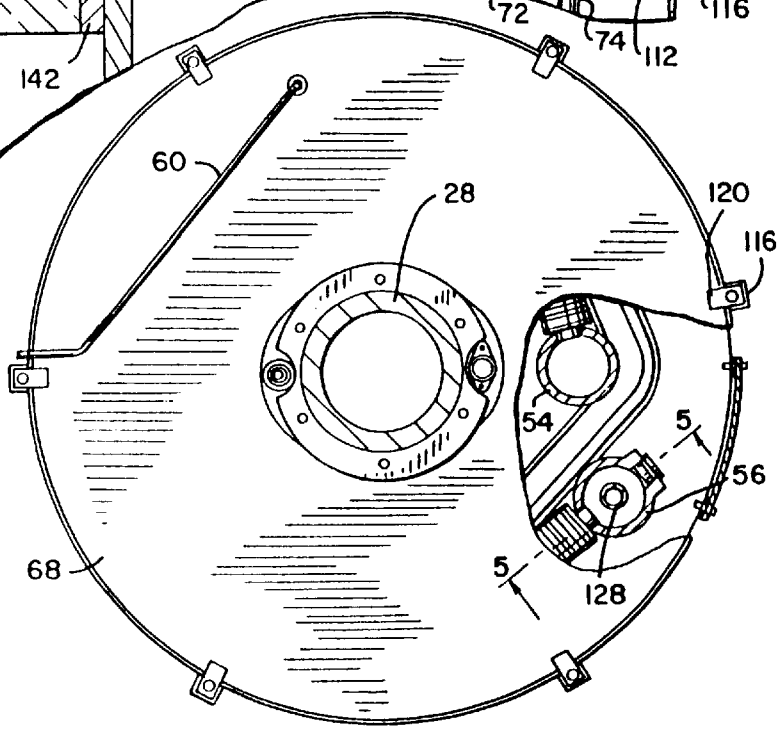
FIG. 4 is a sectional view taken along line 4—4 of FIG. 2.

The liquid to be heated enters through header pipe 56, FIG. 4, circulates through heat exchanger coil 64, and exits through header pipe 54. Header pipe 56 has a lower manifold section 124. FIG. 5, with removable plugs 126 for accessing and cleaning respective sections of heat exchanger coil 64, and has a lower drain 128 which extends downwardly through bottom end wall 16 and is preferably leak-tight sealed thereto by gaskets 130, 132, plate 134, and bolts 136. Header pipe 154 includes lower portion 138, FIG. 3, extending downwardly through cover 24, spacer 140, plate 68, and sleeve 142 through layers 70 and 72. Header pipe 54 includes an upper portion 144 mounted by bolts 146 and flange 148 to upper flange 150 of lower portion 138 and providing a seal at O-ring 152. The upper portion of header pipe 56 is comparable. Upper portion 144 of header pipe 54 includes first and second temperature sensors 154 and 156.

Figure 6:
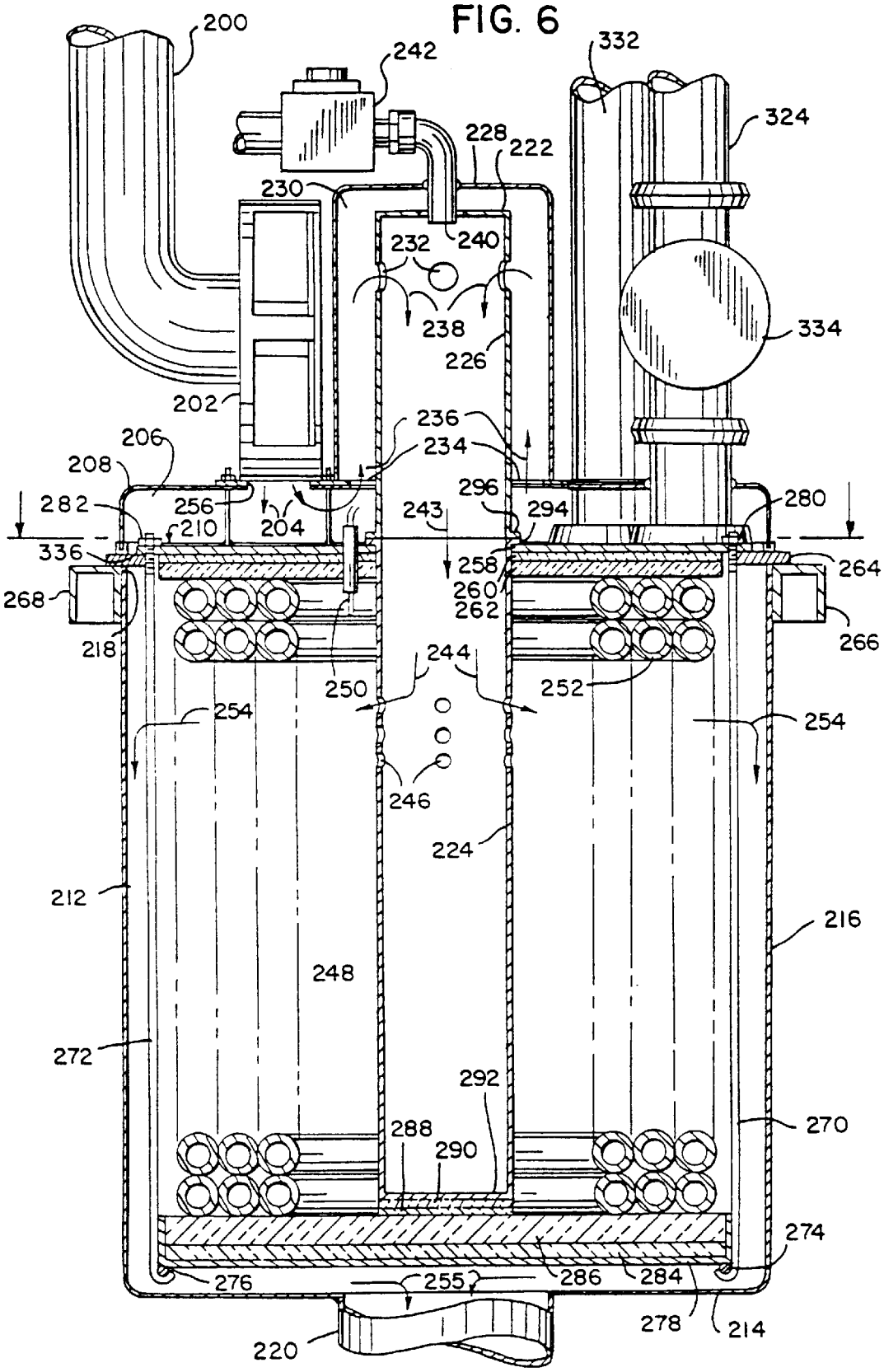
FIG. 6 is a view like FIG. 2 and shows an alternate embodiment.
Figure 7:
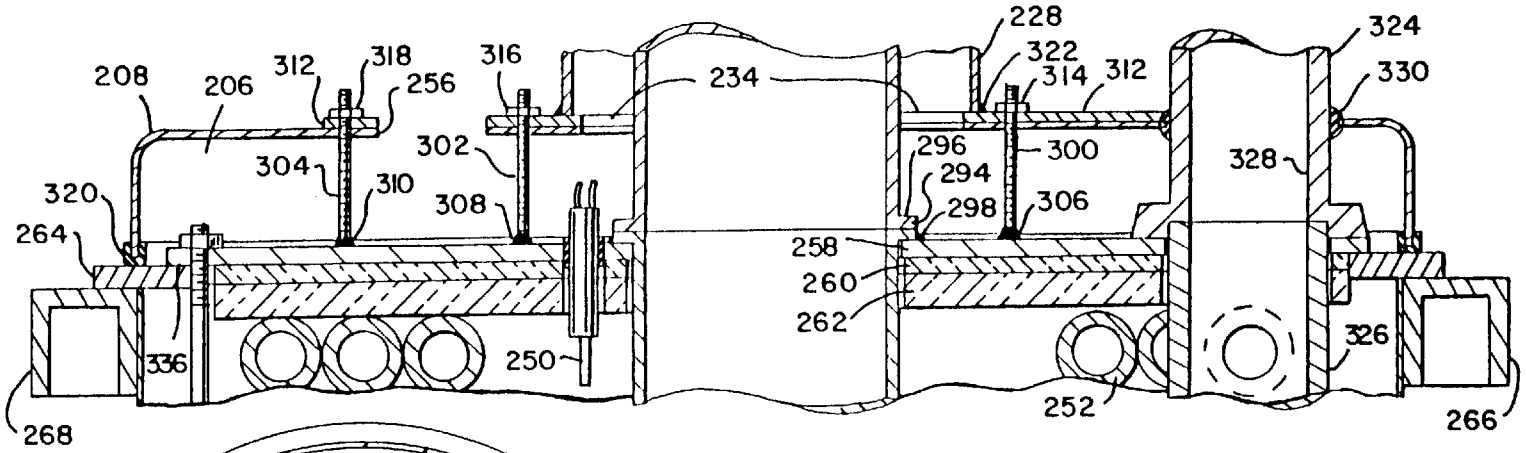
FIG. 7 is an enlarged view of a portion of the structure of FIG. 6.
Figure 8:
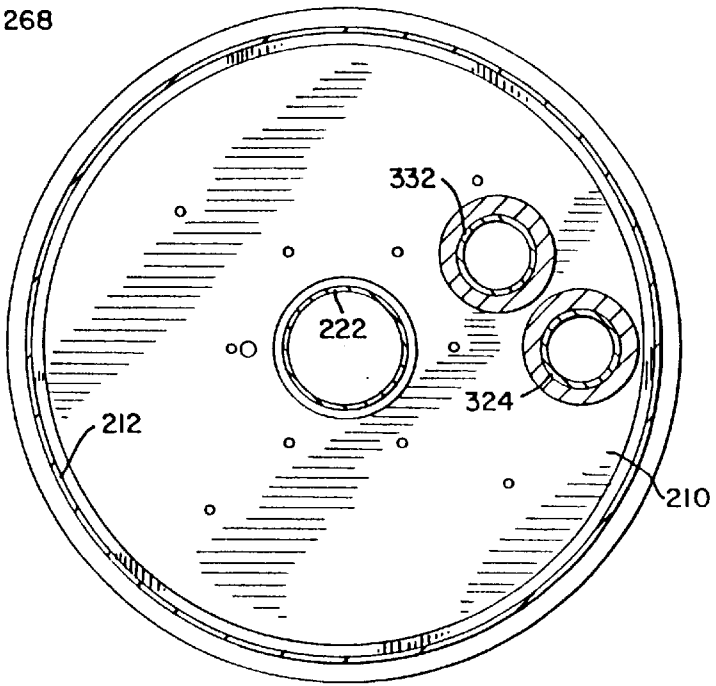
FIG. 8 is a sectional view taken along line 8—8 of FIG. 6.

In an alternate embodiment, FIGS. 6–8, air from air inlet 200 is supplied by blower 202 as shown at arrows 204 to buffer space 206 between cover 208 and end wall 210 of combustion chamber 212. The combustion chamber has distally opposite top and bottom end walls 210 and 214, and a sidewall 216 extending between the end walls. The combustion chamber has an upper opening 218 covered and closed by top end wall 210, and has a lower exhaust outlet 220 through bottom end wall 214.

Mixer and burner assembly 222 has a lower portion 224 extending downwardly through top end wall 210 and into combustion chamber 21. Mixer and burner assembly 222 has an upper portion 226 external of the combustion chamber. A second cover 228 is external to first cover 208 and covers external portion 226 of mixer and burner assembly 222 and defines a second buffer space 230 therebetween. Mixer and burner assembly 222 at upper portion 226 has inlet ports 232 communicating with buffer space 230. Cover 208 has a port 234 communicating with buffer space 230 such that buffer spaces 206 and 230 are in communication with each other through port 234.

Air from blower 202 supplied to buffer space 206 also flows through port 234 as shown at arrows 236 to buffer space 230 and then to inlet 232 and into the mixer and burner assembly as shown at arrows 238. Combustion gas is supplied at gas inlet port 240 from gas valve 242. The combustion air and gas flows downwardly in mixer and burner assembly 222 as shown at arrow 243 and then radially outwardly as shown at arrows 244 through orifices 246 in sidewall 248 of lower portion 224 of the mixer and burner assembly, and into the interior of combustion chamber 212 for ignition by ignitor 250, to in turn heat the liquid in heat exchanger coil 252. The combustion products flow radially outwardly and then downwardly as shown at arrows 254, and are exhausted at outlet 220 as shown at arrows 255. Pressure dropping orifices 232 and 246 provide a restricted flow path reducing the pressure in the combustion chamber to a pressure lower than that in buffer space 206, such that the buffer space is pressurized to a higher pressure than the combustion chamber, and leakage at penetrations flows from buffer space 206 into combustion chamber 212, rather than the reverse. The sum of the pressure drops across orifices 232 and 246 relative to that across exhaust outlet 220 is greater than the pressure drop from blower 202 into space 206 across inlet 256 relative to the buffer outlets at the penetrations.

Top end wall 210 is provided by three layers including an upper metal plate 258, a central heat insulating blanket 260, such as provided by the above noted Fiberfrax Durablanket, and a lower heat insulating board 262, such as provided by the above noted Fiberfrax Duraboard. The outer edge of metal plate 258 rests on an annular disc 264 which is welded to sidewall 216 of the combustion chamber at upper opening 218. The outer edge of annular disc 264 rests on supporting side rails 266 and 268 which are part of the mounting structure for the combustion chamber. Another side rail (not shown) is provided behind the combustion chamber, and the combustion chamber is slid into the page in FIG. 6 between side rail supports 266 and 268 to be supported thereby and by the rear side rail support. Extending downwardly from metal plate 258 are four elongated J-bolts, two of which are shown at 270 and 272. The lower end of the J-bolts curl around a short length of dowel rod such as 274, 276 which is welded to the underside of a metal tray 278, such that tray 278 is suspended and supported below metal plate 258 and adjusted by threaded nuts 280 and 282 at the upper end of respective J-bolts 270 and 272. Resting in pan 278 is a heat insulating blanket 284, such as provided by the above noted Fiberfrax Durablanket, and a heat insulating board 286, such as provided by the above noted Fiberfrax Duraboard. Heat exchanger coil 252 is disposed between boards 286 and 262. Resting on board 286 is a heat insulating blanket 288, such as provided by the above noted Fiberfrax Durablanket, and a heat insulating board 290, such as provided by the above noted Fiberfrax Duraboard. Board 290 engages the bottom 292 of lower portion 224 of mixer and burner assembly 222. Mixer and burner assembly 222 includes the noted lower and upper portions 224 and 226 bolted to each other at flanges 294 and 296 and welded to metal plate 258 at weldment 298, FIG. 7.

Cover 208 is mounted to end wall 210 by bolts such as 300, 302, 304, FIG. 7, which are welded to plate 258 at respective weldments 306, 308, 310 and extend upwardly through cover 208 and metal plate 312 and are secured by respective nuts 314, 316, 318. The outer circumferential edge of cover 208 is received in gasket 320 on annular disc 264. Cover 228 rests on plate 312 on cover 208 and is welded thereto at weldment 322. Header pipe 324 includes a lower portion 326 extending through layers 258, 260, 262 of wall 210, and an upper portion 328 extending through cover 208 at grommet 330. Header pipe 332 is comparable. The liquid to be heated flows through inlet header pipe 324 as pumped by pump 334, and flows through heat exchanger coil 252, and exits through header pipe 332.

In the preferred embodiment, FIG. 2, a first conduit 58 supplies air from the blower to the mixer and burner assembly, and a second conduit 60 independently supplies air from the blower to the buffer space. Air flows through first conduit 58 along a path 34 from blower 32 to mixer and burner assembly 28 without passing through buffer space 26. In the alternate embodiment in FIG. 6, air from blower 202 flows through buffer space 206 to mixer and burner assembly 222. In each embodiment, the penetrations, such as the mixer and burner assembly, header pipes, ignitors, flame sensors, etc., extend through the combustion chamber end wall 14, 210 and the cover 24, 208 in non-leak-tight relation, eliminating the need for leak-tight seals therebetween.

In a further desirable aspect, the interface 334, FIG. 2, and 336, FIG. 6, along which the combustion chamber opening 20, 213 is covered by the top end wall 14, 210, is also within the buffer space 26, 206 and covered by the cover 24, 208, such that leakage at the interface 334, 336 flows from the buffer space 26, 206 into the combustion chamber 12, 212, eliminating the need for a leak-tight sea at such interface 334, 336. In FIG. 3, gasket 338 at interface 334 may be eliminated. In FIG. 7, there is no gasket at interface 336. Since the interface 334, 336 along which the combustion chamber opening is covered and closed by the top end wall 14, 210 is within the buffer space 26, 206 and covered by the cover 24, 208, the noted interface 334, 336 is buffered, and leakage at such interface will flow into the combustion chamber, rather than the reverse.

In another desirable aspect, the cover 24, 208 covers only the top end wall 14, 210 of the combustion chamber 12, 212, and not the other end wall 16, 214 nor the sidewall 18, 216, such that the latter are accruable without removing the cover 24, 208. The buffer space 26, 206 is thin and flat and covers only the top end wall of the combustion chamber.

In the preferred embodiment in FIG. 2, pressure dropping orifice 36 is between blower 32 and mixer and burner assembly 28. Gas inlet port 40 is external to cover 24 and downstream of pressure dropping orifice 36. Buffer space 26 communicates with blower 32 through path 42 upstream of pressure dropping orifice 36.

It is recognized that various equivalents, alternatives and modifications are possible within the scope of the appended claims.

We claim:

1. Combustion apparatus comprising:

a combustion chamber having distally opposite first and second end walls, and having a sidewall extending between said end walls;

a cover external to said combustion chamber and covering said first end wall and defining a buffer space therebetween;

[one or more penetrations] *a plurality of penetrations including a mixer and burner assembly, a liquid inlet, a liquid outlet, a flame sensor, and an igniter, each* extending through said first end wall between said buffer space and said combustion chamber;

a blower external to said cover and supplying air to said buffer space and pressurizing said buffer space to a higher pressure than said combustion chamber such that leakage at said [one or more penetrations] *penetrations in the first end wall* flows from said buffer space into said combustion chamber;

[a] *said* mixer and burner assembly extending into said combustion chamber and receiving combustion air from said blower;

a pressure dropping orifice between said blower and said mixer and burner assembly such that the pressure in said combustion chamber is lower than the pressure in said buffer space;

a first conduit supplying air from said blower to said mixer and burner assembly, and a second conduit independently supplying air from said blower to said buffer space, wherein air flows through said first conduit along a path from said blower to said mixer and burner assembly without passing through said buffer space.

2. Combustion apparatus comprising:

a combustion chamber having distally opposite first and second end walls, and having a sidewall extending between said end walls;

a cover external to said combustion chamber and covering said first end wall and defining a buffer space therebetween;

[one or more penetrations] *a plurality of penetrations including a mixer and burner assembly, a liquid inlet, a liquid outlet, a flame sensor, and an igniter, each* extending through said first end wall between said buffer space and said combustion chamber;

a blower external to said cover and supplying air to said buffer space and pressurizing said buffer space to a higher pressure than said combustion chamber such that leakage at said [one or more penetrations] *penetrations in the first end wall* flows from said buffer space into said combustion chamber;

[a] *said* mixer and burner assembly extending into said combustion chamber and receiving combustion air from said blower;

a pressure dropping orifice between said blower and said mixer and burner assembly such that the pressure in said combustion chamber is lower than the pressure in said buffer space, wherein said mixer and burner assembly includes a portion external of said combustion chamber, and comprising a second cover external to said first mentioned cover and covering said external portion of said mixer and burner assembly and defining a second buffer space therebetween, said mixer and burner assembly having an inlet port communicating with said second buffer space.

3. The invention according to claim 2 wherein said first cover has a port communicating with said second buffer space such that said first mentioned buffer space and said second buffer space are in communication with each other through said port in said first cover, and such that air from said blower supplied to said first buffer space also flows through said port in said first cover to said second buffer space and then to said inlet port of said mixer and burner assembly.

4. Combustion apparatus comprising:

a combustion chamber having distally opposite first and second end walls, and having a sidewall extending between said end walls;

[one or more] *a plurality of* penetrations, including a mixer and burner assembly, *a liquid inlet, a liquid outlet, a flame sensor, and an igniter, each* extending through said first end wall;

a cover external to said combustion chamber and covering said first end wall and defining a buffer space therebetween;

a blower supplying air to said mixer and burner assembly along a first path through a first conduit, and supplying air to said buffer space along a second path through a second conduit and pressurizing said buffer space to a higher pressure than said combustion chamber, *such that, in use, leakage at penetrations in the first end wall flow from the buffer space to the combustion chamber,* wherein said first path extends from said blower to said mixer and burner assembly without passing through said buffer space.

5. The invention according to claim 4 comprising a pressure dropping orifice between said blower and said mixer and burner assembly such that the pressure in said combustion chamber is lower than the pressure in said buffer space.

6. The invention according to claim 5 wherein said mixer and burner assembly includes a gas inlet port downstream of said pressure dropping orifice.

7. The invention according to claim 6 wherein said gas inlet port is external to said cover.

8. The invention according to claim 5 wherein said buffer space communicates with said blower along said second path through said second conduit upstream of said pressure dropping orifice.

9. Combustion apparatus comprising:

a combustion chamber having distally opposite first and second end walls, and having a sidewall extending between said end walls, said combustion chamber having an exhaust outlet;

[one or more] *a plurality of* penetrations, including a mixer and burner assembly, *a liquid inlet, a liquid outlet, a flame sensor, and an igniter,* extending through said first end wall;

a cover external to said combustion chamber and covering said first end wall and defining a buffer space therebetween, said buffer space having a buffer outlet;

a blower supplying air to said buffer space and to said mixer and burner assembly, wherein there is a first pressure drop R1 from said blower to said mixer and burner assembly, a second pressure drop R2 from said mixer and burner assembly to said combustion chamber, a third pressure drop R3 from said blower to said buffer space, a fourth pressure drop R4 across said buffer outlet, and a fifth pressure drop R5 across said exhaust outlet, wherein $$\frac{R3}{R4} < \frac{R1 + R2}{R5}.$$

* * * * *